Jan. 27, 1948. T. M. MYRICK 2,435,153
OPEN PAN EVAPORATOR
Filed April 10, 1944
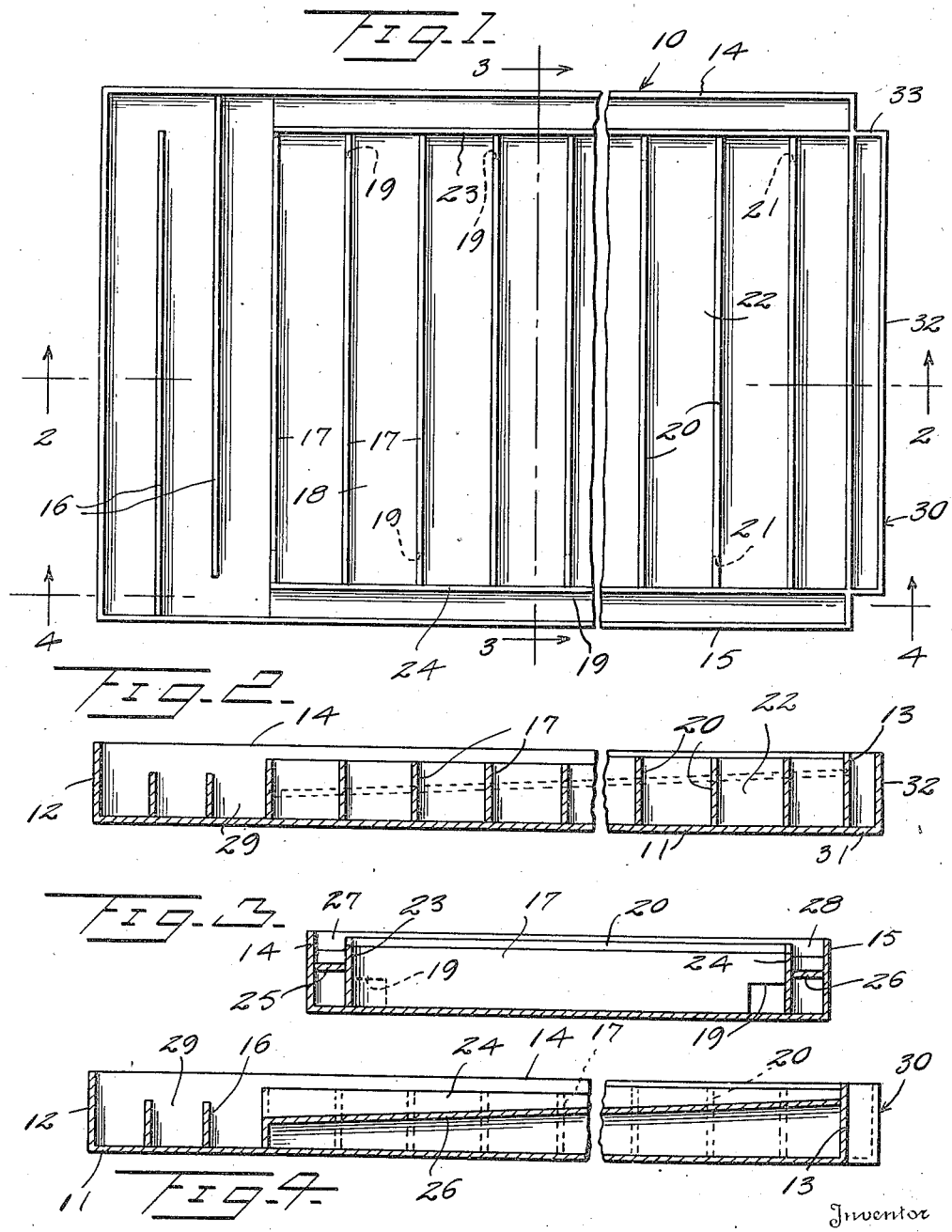
Inventor
T. M. Myrick
By Kimmel & Crowell
Attorneys Patented Jan. 27, 1948

2,435,153

UNITED STATES PATENT OFFICE 2,435,153

OPEN PAN EVAPORATOR

Travis M. Myrick, Hattiesburg, Miss.

Application April 10, 1944, Serial No. 530,429

1 Claim. (Cl. 159—32)

This invention relates to evaporators and more particularly to the open top type.

An object of this invention is to provide an evaporator adapted to reduce juice, sap or the like to a syrup and which is so designed as to provide for removal of the scum.

Another object of this invention is to provide an evaporator which is formed of a rectangular open top receptacle having a plurality of transversely disposed partitons therein, the partitions having openings in the lower portions thereof so that the chambers formed by the partitions will communicate one with another. The receptacle also includes one or more scum troughs whereby the scum may be discharged from the evaporating chambers.

A further object of this invention is to provide in an evaporator of this kind means for keeping the syrup at one end of the device in a fairly cool condition.

In the drawings:

Figure 1 is a top plan of an evaporator constructed according to an embodiment of this invention;

Figure 2 is a sectional view taken on the line 2—2 of Figure 1;

Figure 3 is a sectional view taken on the line 3—3 of Figure 1; and

Figure 4 is a sectional view taken on the line 4—4 of Figure 1.

Referring to the drawing, the numeral 10 designates generally a receptacle of rectangular configuration having an open top and including a flat bottom wall 11, opposite end walls 12 and 13, and opposite side walls 14 and 15. The receptacle 10 is adapted to be placed on a heater whereby the contents of the receptacle will be heated, the water or moisture evaporating from the liquid, which may be a juice or sap which, when the desired amount of moisture has been removed therefrom, will form a syrup of desired consistency.

The receptacle 10 has mounted within one end portion thereof a plurality of upstanding baffles 16 which are shorter in height than the height of the side walls 14 and 15. These baffles are arranged in staggered relation, with alternate ends thereof spaced from the adjacent side walls so as to thereby provide a tortuous passage. The receptacle 10 also has mounted therein a plurality of partitions 17 which are of greater height than the partitions 16 but of less height than the side walls 14 and 15. The partitions 17 divide the receptacle 10 into a plurality of chambers 18 within which the liquid is heated, and the several chambers 18 communicate one with another through openings 19 provided in the partitions 17 adjacent the lower edges thereof and at the opposite ends, as shown in Figure 3. In this manner the liquid will flow from one chamber to another, but as the openings 19 are positioned below the upper edges of the partitions 17, any scum or accumulation at the top of the liquid will be retained in each chamber.

The receptacle 10 also has mounted therein a plurality of partitions 20 extending from the rearmost of the partitions 17, the partitions 20 being of slightly less height than the side walls 14 and of greater height than the partitions 17. The partitions 20 also have openings 21 which, in this instance, are positioned at alternate ends of adjacent partitions 20 so that there will be provided a tortuous passage for the fluid flowing from one chamber 22 formed by pairs of the partitions 20 to an adjacent chamber 22. The partitions 20 are of greater height than the partitions 17 so that any bubbling of the liquid in the chambers 18 or overflowing of the scum will not flow into the chambers 22.

The partitions 17 and 20 are secured at the opposite ends thereof to inner side walls 23 and 24, which are of less length than the side walls 14, the side walls 23 and 24 terminating at the foremost partition 17, as shown in Fig. 1. The inner side walls 23 and 24 are of the same height as the respective partitions 17 and 20, there being a step or reduced portion in the side walls 23 and 24 between the rearmost chamber 18 and the foremost chamber 22. A pair of inclined trough bottom walls 25 and 26 are secured between the side walls 14 and 23, and 15 and 24, respectively, so as to thereby form parallel troughs 27 and 28 along the outer sides of the inner side walls 23 and 24. The troughs 27 and 28 are inclined downwardly in the direction of the receiving chamber 29 formed by the baffles 16 and terminate at their lowermost forward ends at the foremost partition 17. These troughs 27 and 28 are adapted to receive any scum which may overflow from the chambers 18 or 22 or any scum which may be skimmed off from the liquid in the respective chambers.

The syrup within the chambers 22 is adapted to be maintained in a relatively cool condition by means of a cooling receptacle 30 formed at the rear end of the receptacle 10. The receptacle 30 includes a bottom wall 31 which is continuous with the bottom wall 11, a vertical end wall 32, and opposite walls 33. The receptacle 30 is adapted to receive water or the like and is preferably positioned at the unheated end of the evaporator receptacle 10 so that the cooling medium in the receptacle 30 will not be heated, but will provide a heat exchange whereby the syrup in the syrup chambers 22 will be maintained at a degree somewhat less than the temperature of the liquid in the chambers 18.

In the use of this evaporator, the receptacle 10 is placed on a heater of suitable construction, the heat being applied to the bottom of the receptacle 10 for a portion of the length of the receptacle from the receiving to the syrup end thereof. The liquid in the form of juice or syrup is placed in the liquid or receiving chamber 29, flowing in a tortuous passage from the chamber 29 to the chambers 18. The chambers 18 will have liquid of the same height of the liquid in chamber 29 and preferably the height of the liquid in chambers 18 may be slightly below the upper edges of partitions 17. As the liquid is being heated in the chambers 18, the scum will rise to the surface and may bubble over and enter the troughs 27 and 28. The liquid from the troughs 27 and 28 will drain back to the liquid receiving chamber 29 and may finally be removed from this latter chamber. As the liquid in the chambers 18 becomes thick through evaporation of moisture, and as quantity thereof reduces by reason of the evaporation of moisture, additional liquid may be placed in the receiving chamber 29 to bring the entire contents of the receptacle 10 up to the desired level. The thicker liquid or syrup will pass from the chambers 18 to syrup chambers 22 and will be cooled in these latter chambers by the cooling medium in the cooling receptacle 30. The undesirable material in the form of scum which does not bubble over the side walls 23 and 24 forming the end walls of chambers 18 may be skimmed by a suitable instrument and discharged into the side troughs 27 and 28. After the syrup has reached the desired consistency, it may be removed from the syrup chambers 22, the syrup in the chambers 22 having little if any scum on the upper surface thereof, so that this syrup will be pure syrup and as the syrup is removed from the syrup chambers 22 the syrup in the chambers 18 and any syrup in chamber 29 will flow toward the chambers 22, it being understood that the liquid or syrup in all of the chambers will be substantially the same level.

The evaporator hereinbefore described is of simple construction and will provide syrup of the desired consistency more readily than when the syrup is placed in a pot or receptacle and heated at the bottom. With an evaporator as hereinbefore described a considerable amount of the scum will overflow the side walls 23 and 24 forming the end walls of the chambers 18 and 22 and the inner side walls of the troughs 27 and 28. This device may be made of any desired size, including length, width, and height, and there may be as many baffles and partitions 17 and 20 as may be desired so as to thereby form the several chambers of the desired length.

It might be stated that the cooling member 30 prevents the syrup from becoming scorched as the consistency of the liquid approaches the final syrup stage. The partitions between the several liquid chambers serves to divide the scum so that the scum cannot accumulate at one point and cannot bubble over into the end chambers. In this manner the scum will be retained in each chamber and any bubbling over of the scum will cause it to enter the scum troughs and thus be carried away from the syrup chambers.

What is claimed is:

A device as described consisting of a heatable rectangular pan having side and end walls arranged severally in parallelism, a pair of inside longitudinal walls extending in parallel relation but spaced apart from the side walls of the pan, said inside walls at their outer ends intersecting one end wall of the pan and projecting slightly therebeyond, the inner ends of the inside walls being spaced inwardly from the other end wall of the pan, said inside walls consisting of two sections, of which the inner section is a higher uniform level than the outer section thereof, the bottom of the pan also forming the bottom for the projecting ends of the inside walls beyond the mentioned end wall of the pan, and a continuous longitudinally spaced apart series of transversely extending partitions arranged to connect with the inside walls at opposite ends, being formed successively with lower corner end slots arranged in staggered relation to each other longitudinally of the pan, one of said partitions having its ends connected to the outside projecting ends of the inside walls and being also connected to the bottom therefor to provide a cooling trough beyond one of the end walls of the pan, a series of transversely extending partitions arranged with their ends in staggered relation in advance of the inside walls, and a pair of oppositely arranged longitudinally extending downwardly inclined shelves fitting snugly between the side walls of the pan and the inside walls thereof with its higher plane at the rear of the pan spaced below the top edge of the side wall sections of higher level and having their free ends slightly raised above the bottom of the pan and located in alignment with the first and innermost of the first named partitions.

TRAVIS M. MYRICK.

REFERENCES CITED

The following references are of record in the file of this patent:

UNITED STATES PATENTS

| Number | Name | Date |
| --- | --- | --- |
| 173,270 | Clegg | Feb. 8, 1876 |
| 219,158 | Jackson | Sept. 2, 1879 |
| 1,708,021 | Lenz et al. | Apr. 9, 1929 |
| 2,083,861 | Padgett | June 15, 1937 |